(12) United States Patent
Bartoli et al.

(10) Patent No.: US 7,349,291 B2
(45) Date of Patent: Mar. 25, 2008

(54) PULSE-ECHO RANGING SYSTEM

(75) Inventors: Dan Bartoli, Peterborough (CA); Gordon Li, Peterborough (CA)

(73) Assignee: Siemens Milltronics Process Instruments, Inc., Ontario (CA)

( * ) Notice: Subject to any disclaimer, the term of this patent is extended or adjusted under 35 U.S.C. 154(b) by 25 days.

(21) Appl. No.: 11/598,182

(22) Filed: Nov. 9, 2006

(65) Prior Publication Data

US 2007/0223312 A1    Sep. 27, 2007

(30) Foreign Application Priority Data

Nov. 9, 2005    (EP)    ................................. 05024464

(51) Int. Cl.
*G01F 23/284*    (2006.01)
(52) U.S. Cl. ......................................... 367/98; 367/903
(58) Field of Classification Search ................. 367/98, 367/908, 99, 903; 342/124; 324/644
See application file for complete search history.

(56) References Cited

U.S. PATENT DOCUMENTS 4,831,565 A * 5/1989 Woodward .................... 367/99
4,890,266 A * 12/1989 Woodward .................... 367/99
6,298,008 B1 * 10/2001 Lyon et al. .................... 367/99
2004/0074295 A1 * 4/2004 Michalski et al. .......... 324/644

FOREIGN PATENT DOCUMENTS

EP    1785699 A1 *    5/2007

* cited by examiner

*Primary Examiner*—Daniel Pihulic

(57) ABSTRACT

A method and apparatus for controlling pulses in a pulse-echo level measurement or time-of-flight ranging system. The apparatus comprises a controller, a transducer, and an energy storage device. The energy storage device is operatively coupled to the transducer through a relay. The relay is enabled and disabled by the controller and in the disabled state the energy storage device is allowed to accumulate energy. The energy is stored in the energy storage at a variable voltage level. The controller includes a component for determining a voltage level corresponding to an acceptable confidence level for echo pulses. The controller includes another component for determining a voltage level an increased response time.

4 Claims, 4 Drawing Sheets

PULSE-ECHO RANGING SYSTEM

CROSS REFERENCE TO RELATED APPLICATIONS

This application claims priority of European application No. 05024464.9 EP filed Nov. 9, 2005, which is incorporated by reference herein in its entirety.

FIELD OF THE INVENTION

This invention relates to a pulse-echo ranging system.

BACKGROUND OF THE INVENTION

Pulse-echo ranging systems, also known as time-of-flight ranging systems, are often used in level sensing and level measurement applications. Pulse-echo ranging systems determine the distance to a reflective surface (i.e. reflector) by measuring the length of time following a transmission of a burst of energy pulses that the echo or reflected pulse is received. Ultrasonic pulses or microwave signals are typically used in pulse-echo systems.

Pulse-echo ranging systems typically include a transducer and a microprocessor or signal processor operating under stored program control. The transducer both sends and receives pulses. The system typically includes an energy reservoir (for example, for loop powered applications) which is coupled to the transducer. The energy reservoir stores the leftover energy that is not consumed by the other power-consuming components in the circuit.

The amount of transmit energy output by the transducer is dependant upon the energy stored in the energy reservoir. The microprocessor typically includes a code component (i.e. function or routine) that monitors the reservoir voltage and only allows the transducer to transmit when the reservoir voltage is above a threshold voltage level.

It will be appreciated that a fixed threshold voltage imposes a trade-off between speed and accuracy. The threshold voltage has an effect on the accuracy of the measurement. A greater threshold voltage results in a greater ultrasonic output signal, which in turn generates an improved echo with greater echo strength and confidence.

A higher threshold voltage also requires more time for the energy reservoir to reach the threshold value, resulting in a greater elapsed time between consecutive measurements.

One approach encompasses storing a constant threshold voltage value in memory. The constant value allows the unit to meet measurement accuracy and update timing specifications but it does not provide for flexibility to optimize measurement reliability or update time beyond the specification.

In view of the foregoing, there remains a need for improved method and apparatus to address the shortcomings in the art.

BRIEF SUMMARY OF THE INVENTION

The present invention provides a pulse-echo ranging system as defined in the independent claim.

Preferred embodiments of the system and the method according to the invention are specified in the dependent claims.

The system according to the invention can be customized by the user to improve update time and/or measurement accuracy.

BRIEF DESCRIPTION OF THE DRAWINGS

Reference will now be made to the accompanying drawings which show, by way of example, an embodiment of the present invention, and in which.

DETAILED DESCRIPTION OF THE INVENTION

Figure 1:
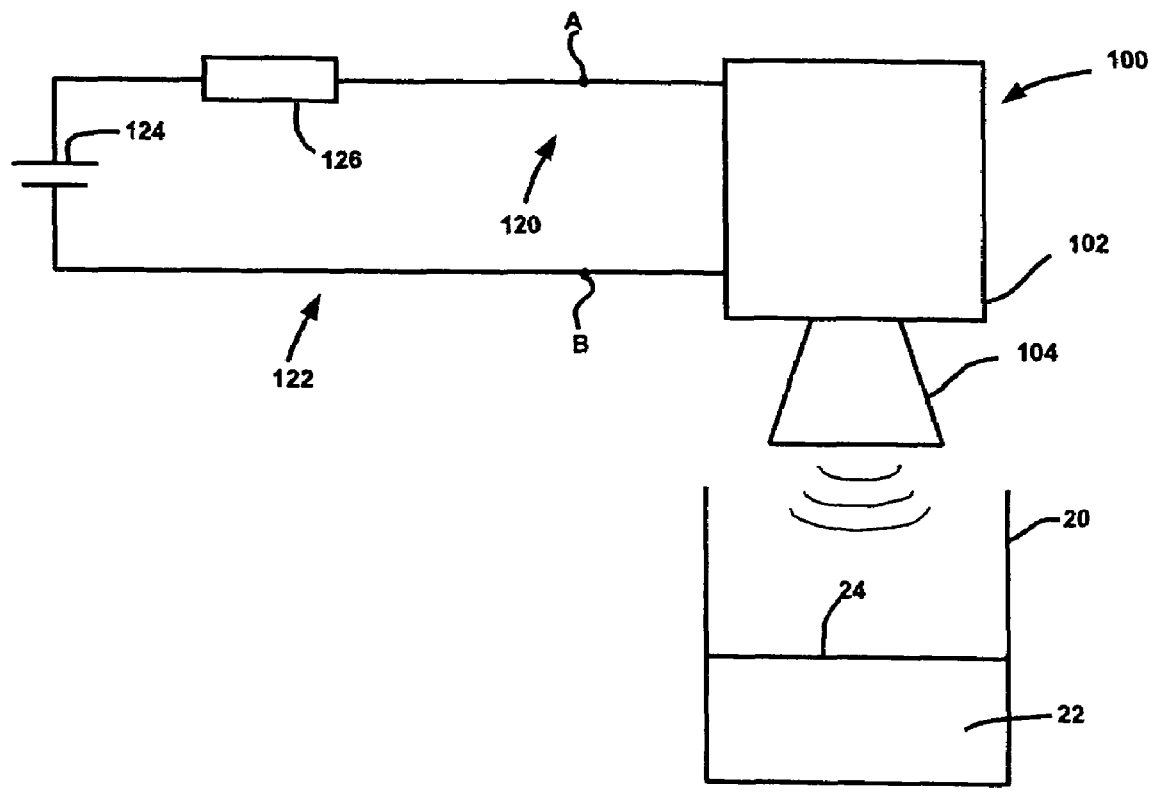
FIG. 1 shows in diagrammatic form a pulse-echo measurement system incorporating a pulse control mechanism according to an embodiment of the present invention.

Reference is first made to FIG. 1 which shows a pulse-echo level measurement system according to an embodiment of the present invention. The pulse-echo level measurement system or device, indicated generally by reference 100, comprises an electronic controller module 102 and a transducer 104. The electronic controller module 102 is typically contained or housed in an enclosure which is attached or coupled to a vessel 20. The vessel 20 holds a material 22, for example, a liquid or granular material. The material 22 has a top surface 24 which serves or acts as a reflector to reflect transmit pulses emitted by the transducer 104. The electronic controller module 102 comprises a controller (for example, a microprocessor or microcontroller operated under stored program control) and electronic circuitry for interfacing to the transducer 104, for example, a transmitter module and a receiver module. The transmitter module is coupled between the controller and the transducer, and operates under stored program control to emit a transmit pulse or burst of pulses from the transducer 104. The receiver module is also coupled between the controller and the transducer, and operates under stored program control to process and digitize the electrical signal from the transducer corresponding to the reflected or echo pulse received from the transducer 104. The microcontroller operates under stored program control to generate an echo profile from the reflected or echo pulse(s) which is then used to determine a level measurement. As will be described in more detail below with reference to an embodiment of the present invention shown FIG. 2, the pulse-echo device 100 includes a pulse control mechanism for controlling the echo confidence level and the response time.

The pulse-echo level measurement system 100 as shown in FIG. 1 comprises a loop powered configuration with an interface 120 to a current loop 122. The current loop 122 provides a power and/or a communication function or capability. The current loop 122 may comprise, for example, the industry standard 4 to 20 mA current loop. This current specification corresponds to a loop voltage in the range of 18 to 30 Volts. The nominal voltage level is 24 Volts and is represented as a DC voltage source 124. A series sense resistor 126 may be employed to monitor the current, for example, to provide an analog method of communicating distance measurement, and to provide a digital method of communication which involves modulating the loop current and monitoring the voltage across the sense resistor 126.

Figure 2:
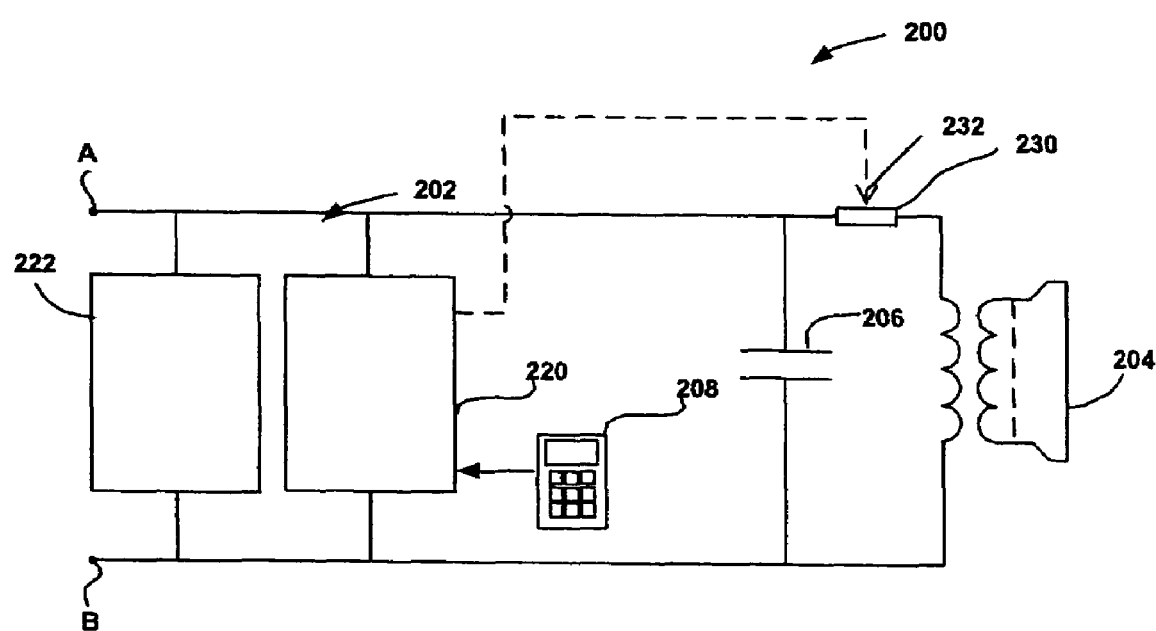
FIG. 2 shows in block diagram form the pulse-echo measurement system of FIG. 1 with a pulse control mechanism according to an embodiment of the present invention.

Reference is next made to FIG. 2 which shows in greater detail the pulse-echo measurement system 100 with a pulse control mechanism according to an embodiment of the present invention. In FIG. 2, the pulse-echo measurement system is indicated generally by reference 200 and comprises an electronic circuit module 202, a transducer 204 and an energy reservoir 206. The pulse-echo measurement module 200 may also include a user interface module 208. The electronic circuit module 202 comprises a microprocessor or microcontroller 220. The microprocessor 220 operates under stored program control, for example, executing code components, i.e. computer code and/or functions stored as firmware or a software program in memory, for performing the functions and operations as described above and below. The other electronic or circuit components are represented by reference 222 and classified generally, together with the microprocessor 220, as power consuming components in the context of the pulse control mechanism. The power consuming components 222 include the transmitter and receiver modules, the electronic components for the current loop interface 120, the electronic components for a display (i.e. the user interface module 208), the electronic components for digital and/or analog communication, a temperature sensor, and power supply and conditioning circuitry.

The energy reservoir 206 provides a reservoir or storage component for power that is provided by the power supply (e.g. the current loop 122) but not consumed by the microprocessor 220 and/or the power consuming components 222 during the level measurement operations and any other background operations (e.g. scheduled or unscheduled). The energy reservoir 206 may be implemented using a high value capacitor. In a loop powered configuration or application, the energy reservoir 206 functions to accumulate and store energy from the current loop 122 at a sufficient level (e.g. voltage) to energize the transducer 204.

The pulse control mechanism comprises a relay 230 which couples the energy reservoir 206 to the transducer 204. The relay 230 has a control input 232 which is coupled to an output port on the microprocessor 220. Under the control of a code component, the microprocessor 220 enables and disables the relay 230 by applying the appropriate control signals to the control input 232. When enabled or activated, the relay 230 couples the energy reservoir 206 to the transducer 204 and the energy reservoir 206 functions to energize, or augment the energizing of, the transducer 204 sufficiently to emit one or more energy pulses.

In operation, the transducer 204 emits a pulse when energy, i.e. from the energy reservoir, is applied to excite the transducer 204. In a loop powered application, a tradeoff generally exists between receiving a reflected or echo pulse of high reliability and obtaining rapid measurements. Since the microprocessor 220 and the other components 222 consume power, it takes time for the energy reservoir 206 to charge. The relay 230 when deactivated by the microprocessor 220 allows the energy reservoir 206 to fully charge, and when actuated the transducer 204 will emit transmit pulse having greater energy, which results in a reflected pulse(s) having greater energy (e.g. amplitude). The microprocessor 220 includes a code component which monitors or measures the voltage level of the accumulating charge (i.e. energy) in the energy storage reservoir 206. The resulting reflected or echo pulses improve the echo profile and provide a higher measurement accuracy or greater confidence level. The confidence level is also referred to as the echo confidence. Therefore, the greater the energy available at the energy reservoir 206 prior to transmission of the transmit pulse or pulses, the greater the echo confidence. If the energy reservoir 206 is allowed to charge for a greater length of time before the relay 230 is actuated, the time between measurement operations for the level measurement system 200 also increases. The time between two successful measurements is termed the update time.

According to one embodiment of the present invention, the microprocessor 220 includes a code component which monitors the echo confidence of the reflected or echo pulse. The microprocessor 220 includes another code component which controls a variable threshold voltage for emitting a transmit pulse from the transducer 204. The code component operates to incrementally increase the threshold voltage and measure the echo confidence level of the resulting reflected pulse until an echo confidence level indicative of a reliable measurement level or range. To optimize or improve the update time, the microprocessor 220 may operate under the control of the code component to reduce the variable threshold voltage if the resulting echo confidence exceeds a reliability threshold which may be predefined, variable, or user defined (for example, through the user interface 208). For a level measurement operation, the microprocessor 220 executes a code component which monitors the threshold voltage on the energy reservoir 206 and activates the relay 230 to enable emission of a transmit pulse from the transducer 204.

According to another embodiment, the microprocessor 220 includes a code component which decreases the variable threshold voltage for emitting a transmit pulse until the echo confidence is at a minimum value which corresponds to a satisfactory echo confidence level. In operation, the variable threshold voltage for a minimum echo confidence level serves to decrease the time required to charge the energy reservoir 206 and thereby also to reduce the update time. To maintain satisfactory measurement accuracy, if the echo confidence falls below the minimum echo confidence level, then the microprocessor 220 may automatically increase the variable threshold voltage (for example, a function or routine running concurrently with a level measurement operation). In operation, the microprocessor 220 monitors the energy reservoir 206 until the measured threshold voltage reaches the predetermined threshold voltage level (i.e. corresponding to a minimum echo confidence level) and then actuates the relay 230 allowing stored energy (i.e. current) to energize the transducer 204 and emit a transmit pulse or burst.

According to another embodiment, the microprocessor 220 includes a code component which sets the variable threshold voltage to a constant value. The threshold voltage value is selected to meet measurement accuracy and update time specifications. In operation, the microprocessor 220 monitors the voltage level of the energy reservoir 206. When monitored voltage level reaches the defined constant value, the microprocessor 220 activates or enables the relay 230 allowing current to flow and energize the transducer 204 for emission of a transmit pulse or burst.

Figure 3:
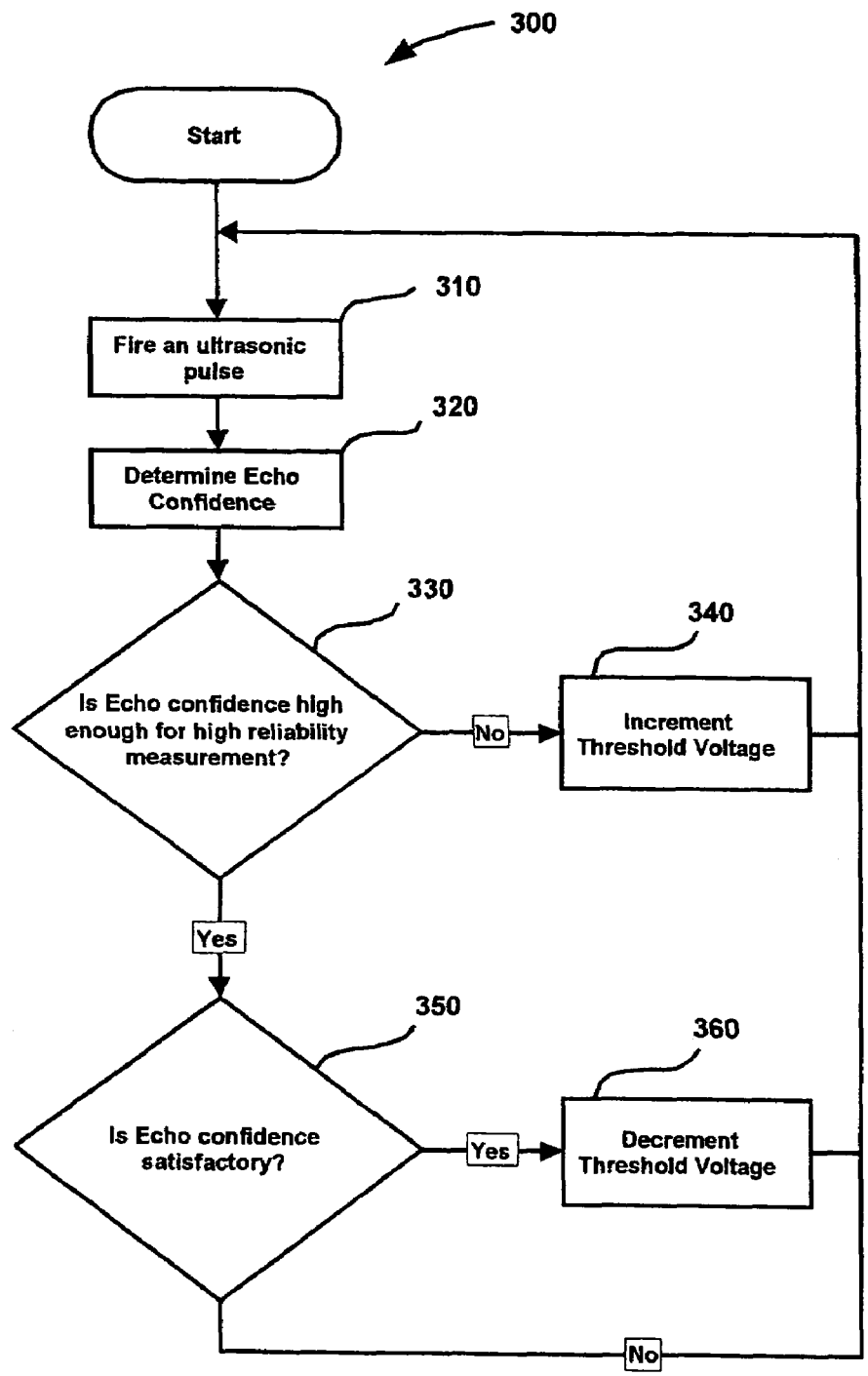
FIG. 3 shows in flowchart form a method of obtaining pulse-echo measurements with the pulse control mechanism according to an embodiment of the present invention.

Reference is next made to FIG. 3 which shows in flowchart form a method for operating the pulse-level ranging system in a high reliability mode and indicated generally by reference 300. High reliability mode corresponds to a high echo confidence level as described above. As shown in FIG. 3, the first operation in step 310 involves firing a transmit pulse. The microprocessor 220 (FIG. 2) operates to activate (i.e. close) the relay 230 and allow current to flow from the energy reservoir 206 to energize the transducer 204 and transmit a pulse or burst. The transmit pulse is reflected by the surface 24 (FIG. 1) of the material 22 held in the vessel 20 to produce a reflected or echo pulse. The echo pulse is received by the transducer 204 and converted into an electrical signal which processed or conditioned prior to being digitized and input to the microprocessor 220. The microprocessor 220 generates an echo profile from the digitized echo pulse(s) and a distance to the surface 24 of the material 22 is determined based on the time-of-flight of the pulse(s).

The next operation at step 320 involves the microprocessor 220 executing a code component to determine an echo confidence level for the receive or echo pulse. As described above, the echo confidence provides a measure of the accuracy of the measurement. A poor or low echo confidence level is typically the result of a pulse of insufficient strength being emitted.

Next at step 330, the microprocessor 220 executes a code component to assess or evaluate the echo confidence level determined in step 320. If echo confidence level is below a minimum threshold value or too low to provide satisfactory or reliable level measurements, then next operation involves incrementing the variable threshold voltage in step 340. The variable threshold voltage may be incremented using a pre-defined value stored in memory or in code as a constant. The variable threshold voltage may also be incremented using a function. Following the increase in the variable threshold voltage, the operations of steps 310 to 330 are repeated.

If the echo confidence level is determined in step 330 to be sufficient for a satisfactory or high reliability measurement, then the next operation at step 350 is determine if the echo confidence level is satisfactory, e.g. not too high for a minimum response time, or for a target or desired update time. As described above, the higher the echo confidence level, the longer the update time, i.e. the time between successive measurements. If the confidence level is determined to be too high, then the next operation executed by the microprocessor 220 involves decrementing or decreasing the variable threshold voltage level in step 360. The variable threshold voltage level may be decremented using pre-defined step value stored in memory or as a constant in code. The variable threshold voltage level may also be decremented according to a function. Following the operation in step 360, the operations associated with steps 310 to 330 are repeated as described above.

If the echo confidence level is determined to be satisfactory, e.g. not to exceed an upper value or be too high at step 350, then the operations for the method 300 are repeated. The processing steps may be repeated periodically as a loop running in the background or the method may be executed before a level measurement operation.

Figure 4:
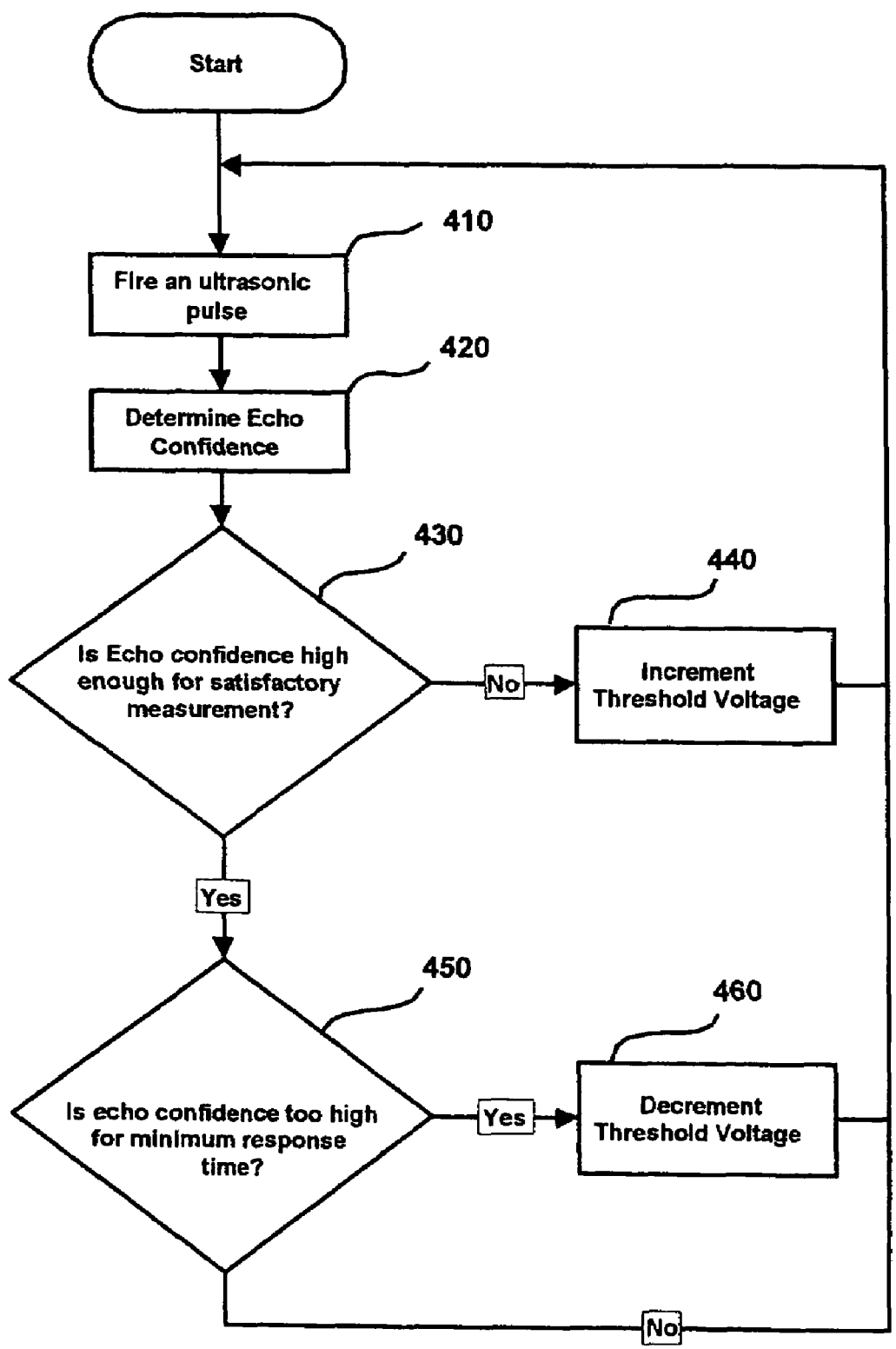
FIG. 4 shows in flowchart form a method of obtaining pulse-echo measurements with the pulse control mechanism according to another embodiment of the present invention.

Reference is next made to FIG. 4 which shows in flowchart form a method for operating the pulse-level ranging system in a minimum response time mode and indicated generally by reference 400. As described above, the lower the response time the quicker consecutive measurements can be made by the level measurement device 200 (FIG. 2). As shown in FIG. 4, the first operation in step 410 involves firing a transmit pulse. The microprocessor 220 operates to activate (i.e. close) the relay and allow current to flow from the energy reservoir 206 to energize the transducer 204 and transmit a pulse or burst. The transmit pulse is reflected by the surface 24 (FIG. 1) of the material 22 held in the vessel 20 to produce a reflected or echo pulse. The echo pulse is received by the transducer 204 and converted into an electrical signal which processed or conditioned prior to being digitized and input to the microprocessor 220. The microprocessor 220 generates an echo profile from the digitized echo pulse(s) and a distance to the surface 24 of the material 22 is determined based on the time-of-flight of the pulse(s).

The next operation at step 420 involves the microprocessor 220 executing a code component to determine an echo confidence level for the receive or echo pulse. As described above, the echo confidence provides a measure of the accuracy of the measurement. A poor or low echo confidence level is typically the result of a pulse of insufficient strength being emitted.

Next at step 430, the microprocessor 220 executes a code component to assess or evaluate the echo confidence level determined in step 420, for example, is the echo confidence level high enough for a satisfactory measurement. If echo confidence level is not high enough, then the variable threshold voltage is increased or incremented in step 440. The variable threshold voltage may be incremented using a pre-defined value stored in memory or in code as a constant. The variable threshold voltage may also be incremented using a function or polynomial relation. Following the increase in the variable threshold voltage, the operations of steps 410 to 430 are repeated.

If the echo confidence level is determined in step 430 is high enough, i.e. to provide a satisfactory measurement, then the next operation at step 450 is determine if the echo confidence level is too high for a minimum response time. If the confidence level is determined to be too high, then the next operation executed by the microprocessor 220 involves decrementing or decreasing the variable threshold voltage level in step 460. The variable threshold voltage level may be decremented using pre-defined step value stored in memory or as a constant in code. The variable threshold voltage level may also be decremented according to a function. Following the operation in step 460, the operations associated with steps 410 to 430 are repeated as described above.

If the echo confidence level is determined not to be too high at step 450, then the operations for the method 400 are repeated. The processing steps may be repeated periodically as a loop running in the background or the method may be executed before a level measurement operation.

The invention claimed is:

1. A pulse-echo ranging system comprising:
   a transducer effective for emitting a pulse and detecting a reflected pulse;
   an energy reservoir effective for storing energy;
   a relay operatively connected between said transducer and said energy reservoir, said relay selectively controllable to couple said energy reservoir to said transducer; and
   a controller comprising:
      a monitoring component effective for monitoring the voltage level at said energy reservoir,
      a processing component effective for processing the reflected pulse to determine an echo confidence level, and
      a controlling component for controlling said relay for coupling said energy reservoir to said transducer at a threshold voltage level, said threshold voltage level being set in dependence on the echo confidence level.

2. The pulse-echo ranging system as claimed in claim 1, wherein said controller further comprises a code component effective for increasing said threshold level if said echo confidence level falls below a minimum echo confidence value.

3. The pulse-echo ranging system as claimed in claim 2, wherein said controller further includes a code component for decreasing said threshold voltage until the echo confidence level reaches a minimum value.

4. The pulse-echo ranging system as claimed in claim 1, wherein said controller further includes a code component for decreasing said threshold voltage until the echo confidence level reaches a minimum value.

* * * * *